United States Patent
Han et al.

(10) Patent No.: US 9,456,377 B2
(45) Date of Patent: Sep. 27, 2016

(54) SYSTEM AND METHOD FOR TRANSMISSION CONTROL PROTOCOL SERVICE DELIVERY IN WIRELESS COMMUNICATIONS SYSTEMS

(75) Inventors: Tao Han, North Arlington, NJ (US); Nirwan Ansari, Montville, NJ (US); Mingquan Wu, Princeton Junction, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 717 days.

(21) Appl. No.: 13/340,027

(22) Filed: Dec. 29, 2011

(65) Prior Publication Data

US 2013/0044595 A1 Feb. 21, 2013

Related U.S. Application Data

(60) Provisional application No. 61/525,465, filed on Aug. 19, 2011.

(51) Int. Cl.
| | |
|---|---|
| *H04J 1/16* | (2006.01) |
| *H04W 28/02* | (2009.01) |
| *H04L 12/807* | (2013.01) |
| *H04L 12/835* | (2013.01) |

(52) U.S. Cl.
CPC .......... *H04W 28/0242* (2013.01); *H04L 47/27* (2013.01); *H04L 47/30* (2013.01)

(58) Field of Classification Search
None
See application file for complete search history.

(56) References Cited

U.S. PATENT DOCUMENTS

| | | | | |
|---|---|---|---|---|
| 2003/0092392 | A1* | 5/2003 | Komandur et al. | 455/67.1 |
| 2005/0259577 | A1* | 11/2005 | Sin | 370/229 |
| 2006/0146695 | A1* | 7/2006 | Maheshwari et al. | 370/216 |
| 2006/0187874 | A1* | 8/2006 | Zaki | 370/328 |
| 2008/0159129 | A1* | 7/2008 | Songhurst | H04L 47/10 370/229 |
| 2008/0239953 | A1* | 10/2008 | Bai et al. | 370/231 |
| 2010/0014520 | A1* | 1/2010 | Matsumoto et al. | 370/390 |
| 2010/0110989 | A1* | 5/2010 | Wu et al. | 370/328 |
| 2010/0131816 | A1* | 5/2010 | Yamamoto et al. | 714/749 |
| 2012/0282968 | A1* | 11/2012 | Toskala et al. | 455/517 |

OTHER PUBLICATIONS

"Digital cellular telecommunications system (Phase 2+); Universal Mobile Telecommunications System (UMTS); LTE; Quality of Service (QoS) concept and architecture (3GPP TS 23.107 version 10.0.0 Release 10)," ETSI TS 123 107, V10.0.0, Mar. 2011, 43 pages.
Bakre, A., et al., "I-TCP: Indirect TCP for Mobile Hosts," Proceedings of the 15th International Conference on Distributed Computing Systems, IEEE Computer Society, 1995, pp. 136-143.

(Continued)

*Primary Examiner* — Chi H Pham
*Assistant Examiner* — Raul Rivas
(74) *Attorney, Agent, or Firm* — Slater Matsil, LLP

(57) ABSTRACT

A method for delivering packets in a wireless communications system includes determining a cause of loss for a previously transmitted packet based on a packet acknowledgement corresponding to the previously transmitted packet, the packet acknowledgement including at least one of a wireless loss indicator and a congestion warning indicator for the wireless communications system. The method also includes adjusting a transmission parameter in a packet transmission protocol according to the cause of loss, and retransmitting the previously transmitted packet.

20 Claims, 8 Drawing Sheets

(56) References Cited

OTHER PUBLICATIONS

Brown, K., et al., "M-TCP: TCP for Mobile Cellular Networks," Jul. 29, 1997, 25 pages.
Casetti, C., et al., "TCP Westwood: End-to-End Congestion Control for Wired/Wireless Networks," Wireless Networks, 2002, pp. 467-479.
Chen, Y-C., et al., "An Adaptive Buffer Allocation Mechanism for Token Bucket Flow Control," Vehicular Technology Conference, IEEE, 2004, pp. 3020-3024.
Claypool, M., et al., "Characterization by. Measurement of a CDMA 1x EVDO Network," Proceedings of the $2^{nd}$ Annual International Workshop on Wireless Internet, Aug. 2006, 8 pages.
Feng, W-C., et al., "Understanding and Improving TCP Performance over Networks with Minimum Rate Guarantees," IEEE, 1997, 25 pages.
Ikegami, D., et al., "Evaluating TCP Throughput and Packet Size Under Policing Environment," Proceedings of IC-BNMT, IEEE, 2010, pp. 19-23.
Li, Z., et al., "A Novel Differentiated Marking Strategy based on Explicit Congestion Notification for Wireless," IEEE, 2006, 4 pages.
Mishra, P.P., "Effect of Leaky Bucket Policing on TCP over ATM Performance," IEEE, 1996, pp. 1700-1706.
Ramakrishnan, K., et al., "The Addition of Explicit Congestion Notification (ECN) to IP," RFC 3168, Sep. 2001, 64 pages.
Van Haalen, R., et al., "Improving TCP Performance with Bufferless Token Bucket Policing: *A TCP friendly policer*," Proceedings of the 2007 $15^{th}$ IEEE Workshop on Local and Metropolitan Area Networks, pp. 72-77.
Wang, K-Y., et al., "Mobile-End Transport Protocol: An Alternative to TCP/IP Over Wireless Links," IEEE, 1998, 8 pages.
Wu, C-S., et al., "Traffic Shaping for TCP Networks: TCP Leaky Bucket," Proceedings of IEEE TENCON'02, IEEE, 2002, pp. 809-812.
Xu, K., et al., "Improving TCP Performance in Integrated Wireless Communications Networks," Computer Networks 47, 2005, 19 pages, Elsevier.
"Akamai Reveals 2 Seconds as the New Threshold of Acceptability for eCommerce Web Page Response Times," Akamai Technologies, Inc., Sep. 2009, 2 pages, http://www.akamai.com/html/about/press/releases/2009/press.

\* cited by examiner

400

Sending Rate Increasing
SRI()
{
    if $(R_n >= R_{max} - \varepsilon)$
        $R_{n+1} = R_n + C;$
    else
        $R_{n+1} = R_n + \chi \times (R_{max} - R_n);$
    end if
}

Sending Rate Decreasing
SRD()
{
    $S_{rec} = S_{unack}^{max};$
    if $(!IP.WLA)$
        $R_{max} = R_n;$
        $R_n = R_n;$
    else
        $R_n = R_n;$
    end if
}

*Fig. 4b*

SYSTEM AND METHOD FOR TRANSMISSION CONTROL PROTOCOL SERVICE DELIVERY IN WIRELESS COMMUNICATIONS SYSTEMS

This application claims the benefit of U.S. Provisional Application No. 61/525,465, filed on Aug. 19, 2011, entitled "System and Method for Transmission Control Protocol Service Delivery in Mobile Networks," which application is hereby incorporated herein by reference.

TECHNICAL FIELD

The present invention relates generally to digital communications, and more particularly to a transmission control protocol service delivery in wireless communications systems.

BACKGROUND

With the ever-increasing convergence of fixed and mobile networks, and the rapid development of wireless access techniques and user devices, Internet applications are steadily moving to wireless communications systems and are frequently accessed through mobile nodes. Although the advanced physical layer technologies have enhanced the capacity and reliability of wireless networks, the service delivery latency in wireless networks often remains too high.

Transmission Control Protocol (TCP) is the de facto standard for Internet-based commercial communication networks. TCP, however, generally cannot differentiate packet loss caused by congestion or wireless interference. The associated service delivery latency generally is too high to satisfy the users' expectations when using mobile nodes. Taking the web service as an example, users generally expect a page to be loaded in less than two seconds, and 40% users waits for no more than 3 seconds before leaving the web sites. Therefore, high network latency hinders the further development of wireless networks.

SUMMARY OF THE INVENTION

Example embodiments of the present invention which provide systems and methods for transmission control protocol service delivery in wireless communications systems.

In accordance with an example embodiment of the present invention, a method for delivering packets in a wireless communications system is provided. The method including determining a cause of loss for a previously transmitted packet based on a packet acknowledgement corresponding to the previously transmitted packet, the packet acknowledgement including at least one of a wireless loss indicator and a congestion warning indicator for the wireless communications system. The method also includes adjusting a transmission parameter in a packet transmission protocol according to the cause of loss, and retransmitting the previously transmitted packet.

In accordance with another example embodiment of the present invention, a method for delivering packets in a wireless communications system is provided. The method including determining if a previously transmitted packet has been lost in transmission according to a sequence number in a packet acknowledgement corresponding to the previously transmitted packet. The method also includes adjusting a first transmission parameter in a packet transmission protocol according to at least one of a wireless loss indicator and a congestion warning indicator in the packet acknowledgement, if the previously transmitted packet has not been lost. The method further includes adjusting a second transmission parameter in the packet transmission protocol according to at least one of the wireless loss indicator and the congestion warning indicator in the packet acknowledgement, and retransmitting the previously transmitted packet, if the previously transmitted packet has been lost.

In accordance with another example embodiment of the present invention, a packet source is provided. The packet source includes a processor, and a transmitter operatively coupled to the processor. The processor determines a cause of loss for a previously transmitted packet based on a packet acknowledgement corresponding to the previously transmitted packet, the packet acknowledgement including at least one of a wireless loss indicator and a congestion warning indicator for a wireless communications system, and adjusts a transmission parameter in a packet transmission protocol according to the cause of loss. The transmitter retransmits the previously transmitted packet.

One of advantages of an embodiment is that causes of packet loss in a wireless communications system are differentiated and different techniques are applied to resolve the different causes of packet loss. Therefore, network latency is typically reduced.

Another one of advantages of an embodiment is that simple techniques for differentiating causes of packet loss, therefore simplifying implementation and reducing costs, while improving overall wireless communications system performance.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4a and 4b illustrate an example sending rate increasing algorithm and an example sending rate decreasing algorithm, respectively, according to example embodiments described herein;

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to service delivery in wireless communications systems. For example, a sender of packets in a wireless communications system, upon receipt of a lost packet notification which includes a network state indication(s), may determine a cause of the lost packet from the lost packet notification and its network state indication(s). The sender may then apply a packet loss resolution technique that is tailored to the cause of the lost packet to adjust transmission protocol parameters, rather than utilizing a generalized lost packet resolution technique. The use of the tailored approach improves service delivery in the wireless communications system.

The present invention will be described with respect to example embodiments in a specific context, namely a wireless communications system utilizing transmission control protocol (TCP) to transmit packets through a wireless air interface, such as the Third Generation Partnership (3GPP) Long Term Evolution (LTE) compliant wireless communications systems. The embodiments of the invention may also be applied, however, to other communications systems that utilize TCP with a combination of wireless and wireline communications networks, including technical standards compliant communications systems, such as IEEE 802.16m, WiMAX, and the like, as well as non-technical standards compliant communications systems.

Figure 1:
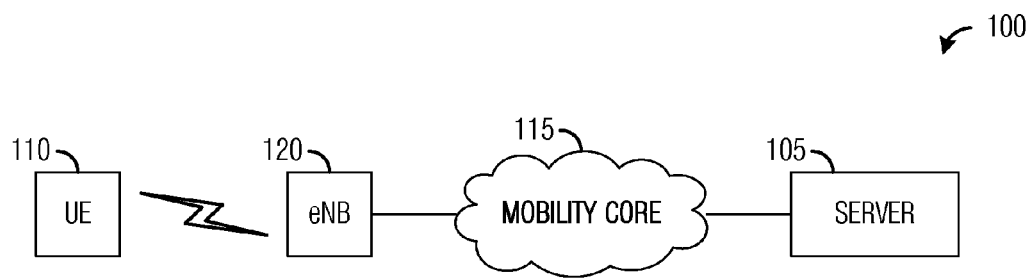
FIG. 1 illustrates an example communications system according to example embodiments described herein.

FIG. 1 illustrates an example embodiment of communications system 100. Communications system 100 includes a server 105 that provides information in the form of packets to a user equipment (UE) 110. The information is transmitted from server 105 to UE 110 over a mobility core network 115 and then delivered wireles sly to UE 110 by an evolved NodeB (eNB) 120. Generally, a UE may commonly be referred to as a mobile station, a user, a terminal, a subscriber, a subscriber equipment, and the like, while an eNB may also be referred to as a base station, a controller, a communications controller, and the like. While it is understood that communications systems may employ multiple eNBs capable of communicating with a number of UEs, only one eNB, and one UE are illustrated for simplicity.

Generally, the delivery of packets in a wireless communications system, such as communications system 100, may encounter several different causes of lost packets: such as, wireless errors, traffic conditioner, and Internet congestion. The ability to differentiate the cause of a lost packet and reacting accordingly may be beneficial to TCP design. An example TCP algorithm, which may be referred to herein as TCP-Mobile Edge (TCP-ME), may detect packet loss due to at least one of wireless errors, network congestion, and traffic conditioner. According to an example embodiment, having the ability to identify the cause of packet loss, TCP-ME may react to the lost packet with different mechanisms tailored to the different causes, thereby improving TCP performance in terms of service delivery latency in the wireless communications system.

Figure 2A:
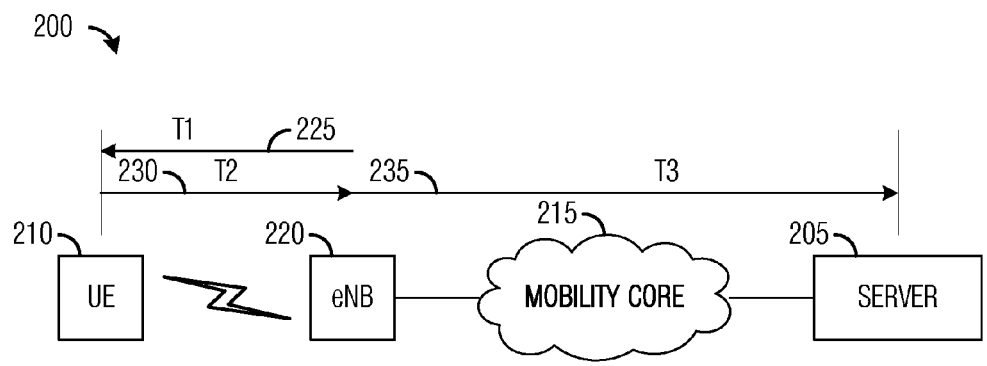
FIG. 2a illustrates an example communications system with focus on packet transmission latency according to example embodiments described herein.

FIG. 2a illustrates an example embodiment of communications system 200 with focus on packet transmission latency. Communications system 200 includes a server 205 that provides information in the form of packets to a UE 210. The information is transmitted from server 205 to UE 210 over a mobility core network 215 and then delivered wirelessly to UE 210 by an evolved NodeB (eNB) 220.

As an example embodiment, a transmission of a packet from eNB 220 to UE 210 over communications link 225 may have a latency of time T1, while a transmission of a corresponding acknowledgement in a reverse direction over communications link 230 may have a latency of time T2. Similarly, a transmission of a packet acknowledgement (ACK) between eNB 220 and server 205 over communications path 235 may have a latency of time T3.

According to an example embodiment, considering the Quality of Service (QoS) mechanisms of wireless communications systems, TCP-ME differentiates packet loss caused by wireless errors, admission control mechanisms of mobile core networks (e.g., traffic conditioners), and Internet congestion, and reacts to the packet loss accordingly.

According to an example embodiment, in order to detect wireless errors, TCP-ME may mark ACK packets in an uplink direction at an eNB, such as eNB 220. For example, the marking of the ACK packets may be according to a marking threshold that is a function of instantaneous downlink queue length and a number of consecutive Hybrid Automatic Repeat Requested (HARQ) retransmissions. While, a modification may be made to a TCP Explicit Congestion Notification (ECN) mechanism with deterministic marking to detect Internet congestion and associated packet loss. Packet loss due to traffic conditioners is detected through a Duplicate ACK (DUPACK) is not marked. TCP-ME may adapt the inter-packets intervals when the packet loss is caused by wireless errors or admission control mechanism (e.g., traffic conditioner). If the packet loss is due to Internet congestion, TCP-ME may apply a congestion window adaptation algorithm, such as, TCP-New Reno's congestion window adaptation algorithm.

Figure 2B:
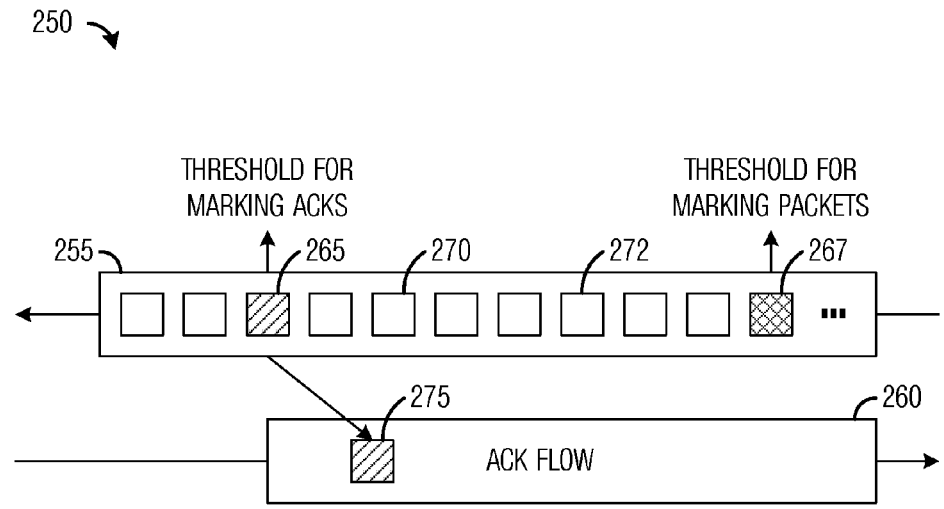
FIG. 2b illustrates an example diagram of queues of downlink and uplink communications link highlighting exemplary thresholds for marking packets and/or ACKs according to example embodiments described herein.

FIG. 2b illustrates a diagram 250 of queues of downlink and uplink communications link highlighting exemplary thresholds for marking packets and/or ACKs. Queue 255 corresponds to a downlink communications link and queue 260 corresponds to an uplink link. As shown in FIG. 2b, queue 255 includes a number of packets, some of which have been marked (e.g., packet 265 and packet 267) and some of which have not been marked (e.g., packet 270 and packet 272), while queue 260 includes an ACK 275. The marked packets are marked due to a meeting of a threshold for marking ACKs and/or a threshold for marking packets. The meeting of the threshold for marking ACKs results in the marking of ACK 275. An example of a threshold may be queue length and if the queue length is greater than a threshold or less than a threshold, then a corresponding packet or ACK may be marked.

According to an example embodiment, in order to detect packet loss caused by wireless errors, a packet acknowledgement (ACK) marking algorithm may be implemented at an eNB, which is generally an interface between a wireless portion of the transmission path and a wireline portion of the communications path. Since the eNB is the interface, it is in a good position to monitor packet loss due to wireless errors.

According to an example embodiment, the ACK marking algorithm proceeds as follows: a Congestion Experienced (CE) bit of an IP header of the ACK is set to a specified value, e.g., a true value or "1", when an equivalent length of a downlink queue of packets to be transmitted to the UE at the eNB is larger than or equal to a predetermined threshold. The CE bit is referred to as a Wireless Loss Alarm (WLA). The equivalent downlink queue length may be calculated as $$L_E = \begin{cases} \frac{L_I}{1-(n/\beta)^3} & \text{for } n < \beta \\ L_{th} & \text{for } n \geq \beta, \end{cases}$$

where $L_E$ is the equivalent queue length, $L_1$ is the instantaneous downlink queue length when the uplink ACK arrives at the BS, $L_{th}$ is the ACK marking threshold, n is the number of consecutive HARQ retransmissions, and fi is maximum allowed HARQ retransmission.

However, rather than detecting wireless congestion, the ACK marking algorithm feeds back wireless errors to the server through the marking of the CE bit in the IP header of ACKs. Furthermore, the eNB typically maintains individual queues for the UEs that it is serving, therefore, the equivalent queue length indicates wireless conditions of individual UEs.

As an example embodiment, the equivalent queue length calculation provides that, the more consecutive HARQ retransmissions there are, the higher the probabilities of the wireless errors, and therefore, the larger the equivalent queue length. Generally, the pure ACK packets should not be marked as ECN capable. Therefore, the CE bit (i.e., the WLA) in the IP header of the ACK packets are only marked at the eNB, and thus the marked ACK packets can effectively reflect the wireless errors. When the TCP sender receives ACKs with the WLA marked, the TCP sender knows that the UE is experiencing poor quality wireless channel(s) and the packet loss indicated by the DUPACKs are more likely to be caused by wireless errors.

According to an example embodiment, in order to detect packet loss due to congestion (e.g., Internet congestion), a Congestion Warning (CW) mechanism is used. For example, a router, which may be any router in the transmission path between the TCP sender to the UE, may mark packets of a queue when an average queue length exceeds a predetermined threshold. Then, when an ACK is generated for a packet (for example, at an eNB) if the packet is marked as having been in a queue with an average queue length exceeding the predetermined threshold, the ACK is also marked. As an example, an ECN-Echo (ECE) bit of the TCP header of the ACK may be set to a predetermined value, e.g., a true value or "1", if the ACK corresponds to a packet that has been marked. The ECE bit may be referred to hereinafter as a CW bit or CW flag. For discussion purposes, considering a situation wherein the TCP sender receives several DUPACKs with the CW bit set. The TCP sender is able to infer that the wireless communications system is in a congested state and that the packet loss indicated by the DUPACKs is more likely to have been caused by congestion.

A maximum bit rate of packet traffic admitted into a wireless communications system is limited by a traffic conditioner on a gateway of the wireless communications system. A token bucket algorithm is recommended as the traffic conditioner by the 3GPP LTE technical standards. Let r be the token rate, and b be the bucket size. Data is conformant if the amount of data submitted during any time period T does not exceed the negotiated token rate or b+rT. The bucket size is recommended to equal the maximum Service Data Unit (SDU) size. Let m be the SDU size; if the packets inter-arrival time is less than m/r, packet data will be dropped.

According to an example embodiment, to avoid the packet loss caused by the traffic conditioner, the TCP sender may estimate the packets inter-arrival time of the gateway, and adjust the packet sending interval accordingly. However, estimating the packets inter-arrival time is not trivial for two reasons. First, the TCP sender does not know the token rate of the traffic conditioner at the gateway. Second, the competing traffic on the intermediate routers may unpredictably change the packet intervals.

Figure 3A:
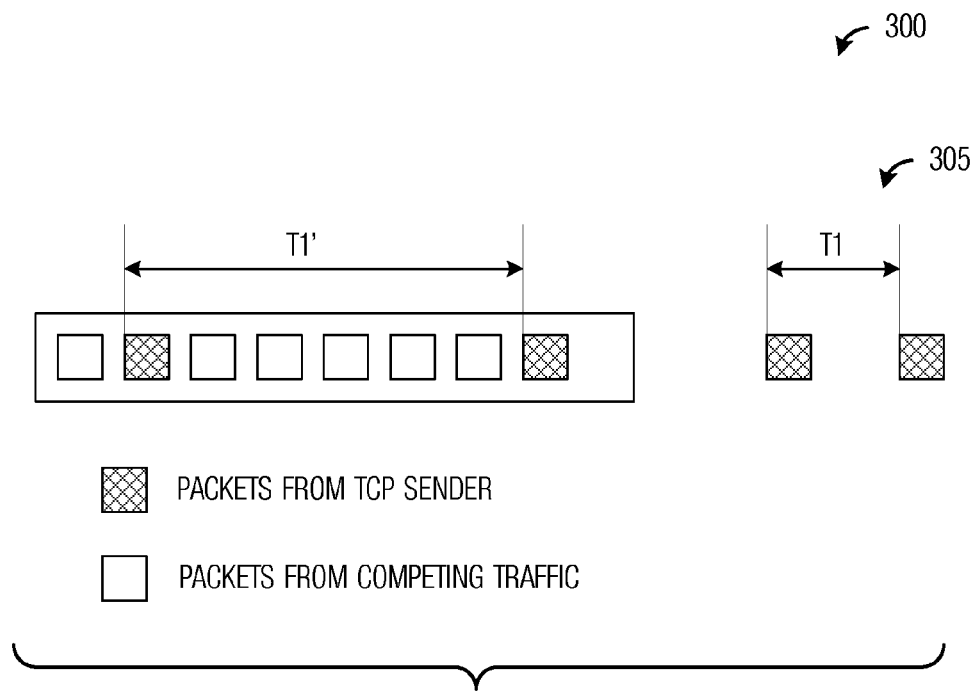
FIGS. 3a and 3b illustrate example scenarios wherein an inter-packet arrival time at packet injection is changed by interaction with other packet traffic according to example embodiments described herein.
Figure 3B:
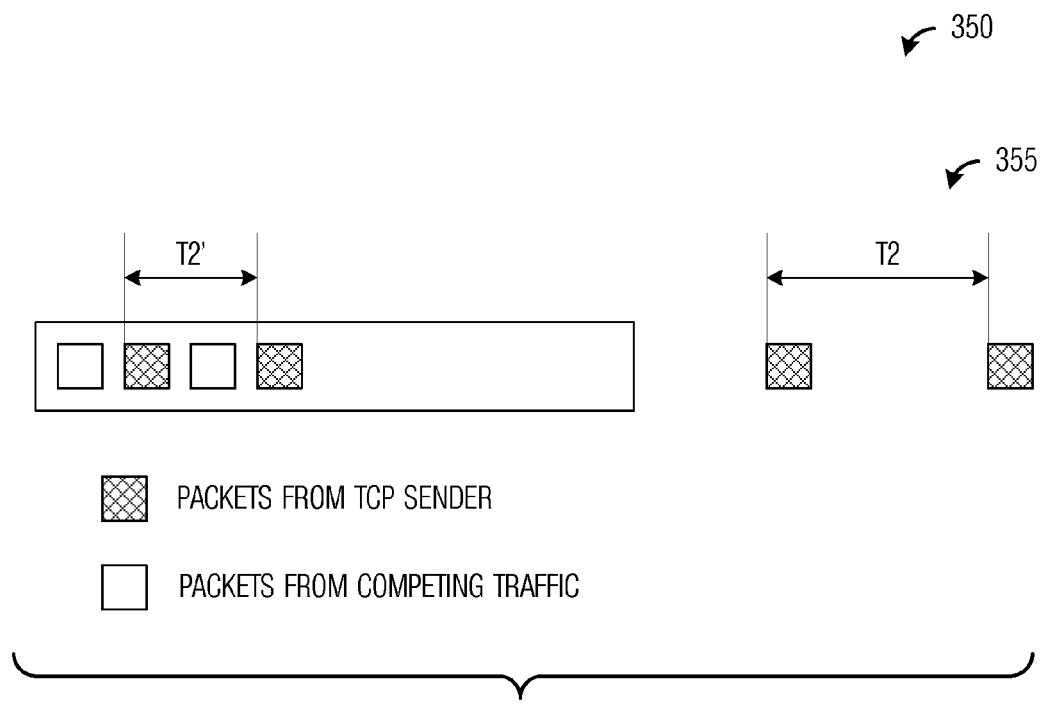

FIGS. 3a and 3b illustrate embodiments of scenarios wherein an inter-packet arrival time at packet injection is changed by interaction with other packet traffic. As shown in FIG. 3a, a diagram 300 of a packet queue highlights packets 305 from a TCP sender with a small inter-packet arrival time T1 are separated by competing traffic and end up with a large inter-packet arrival time T1' in the packet queue. As shown in FIG. 3b, a diagram 350 of a packet queue highlights packets 355 from a TCP sender with a large inter-packet arrival time T2 that is shortened by intermediate routers to a small inter-packet arrival time T2', which results in packet loss at the gateway. Hence, a large inter-packet interval cannot guarantee that packets are properly conditioned by a traffic conditioner at the gateway.

According to an example embodiment, TCP-ME may adjust its packet sending interval according to the indication of packet loss caused by the traffic conditioner. As discussed previously, TCP-ME recognizes the wireless errors by checking whether the WLA (i.e., the CE bit) in the IP header of the DUPACK is marked, and detects the Internet congestion by checking whether the CW bit (i.e., the ECE bit) in the TCP header of the DUPACK is marked. If neither the WLA nor the CW bit is marked, TCP-ME determines that the cause of the packet loss as being due to the inter-packet arrival interval being smaller than the inter-token arrival interval.

In such a situation, TCP-ME sets a maximum sending rate, for example, $R_{max}$, to the current sending rate, $R_n$, which equals to $1/T_n$, where $T_n$ is current packet sending interval, and reduces the sending rate by a factor α. To make sure the sending rate is only reduced once in one Round Trip Time (RTT), TCP-ME sets the recovery sequence number, $S_{rec}$, to a maximum unacknowledged sequence number, $S_{nack}^{max}$, when the sending rate is reduced. When the TCP sender receives a DUPACK that indicates a packet loss due to traffic conditioner, the TCP sender checks the sequence number of the lost packet first. Only when the sequence number is larger than $S_{rec}$, does the TCP sender reduce the sending rate.

FIGS. 4a and 4b illustrate an example embodiment of a sending rate increasing algorithm 400 and a sending rate decreasing algorithm 450, respectively. As shown in FIGS. 4a and 4b, various parameters control a transition between additive rate increasing and the proper rate searching: for example, C is an additive rate increasing step; and χ, which is less than 1, is a factor for proper rate searching, and a larger χ indicates a more aggressive rate increase. Since SRI( ) reacts to packet loss caused by both wireless errors and traffic conditioner, TCP-ME differentiates the sources of the packet loss. If the packet loss is caused by traffic conditioner, SRD( ) sets $R_n$ as $R_{max}$ since $R_n$ is more likely reflecting the upper bound of the allowing sending rate.

Otherwise, if the packet loss is caused by wireless error, the TCP sender does not update $R_{max}$ since the packet loss does not indicate the upper limit of the traffic conditioner. However, as an embodiment, the TCP sender reduces the sending rate by a factor α for several reasons. First, if WLA in the IP header of DUPACK is marked, it indicates that the UE is experiencing bad wireless condition. Therefore, reducing packet sending rate can avoid excessive packets loss due to wireless errors. Second, TCP-ME reduces the sending rate rather the congestion window since reducing the sending rate can also increase the probability that the packets are admitted by the traffic conditioner on the gateway of mobile networks.

Figure 5:
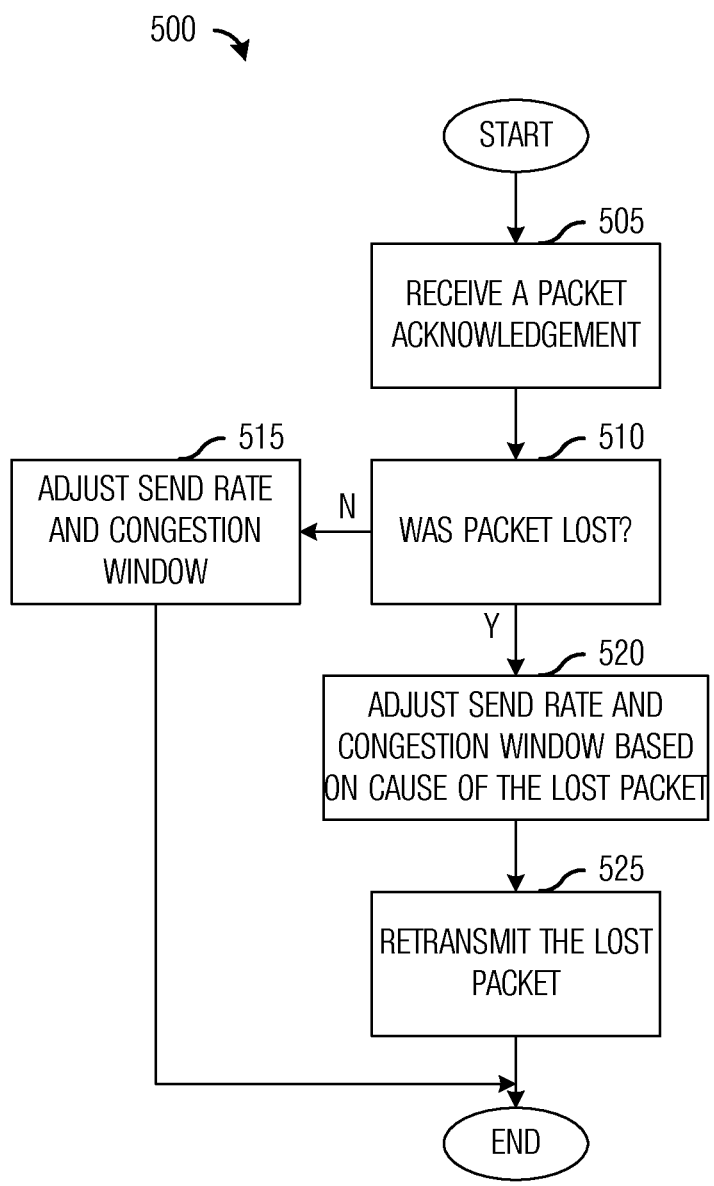
FIG. 5 illustrates an example flow diagram of a high level view of operations in configuring service delivery in a TCP wireless communications system according to example embodiments described herein.

FIG. 5 illustrates an example embodiment of flow diagram of a high level view of operations 500 in configuring service delivery in a TCP wireless communications system. Operations 500 may be indicative of operations occurring in a TCP sender, such as server 105 or server 205, as the TCP sender adjusts TCP parameters to meet wireless communications system conditions.

Operations 500 may begin with the TCP sender receiving a packet acknowledgement corresponding to a packet that it transmitted to a UE (block 505). According to an example embodiment, the packet acknowledgement may be referred to as an ACK and may be responsive to a packet that was transmitted by the TCP sender. The ACK may be generated by an eNB that is an interface between a wireline portion of a transmission path from the TCP sender to the UE and a wireless portion of the transmission path.

The TCP sender may perform a check to determine if the packet that is associated with the ACK was lost during its delivery to the UE (block 510). Generally, packets transmitted by the TCP sender are assigned sequence numbers which help to ensure that the packets are received in order of transmission. Furthermore, the sequence numbers may be used to help determine if a packet is lost. As an example, at the UE, if the UE receives packets with a discontinuity in the packet sequence number, then a packet associated with a missing sequence number may have been lost. The UE may transmit an ACK with the missing sequence number to the TCP sender. At the TCP sender, if the TCP sender receives multiple ACKs with the same sequence number, the TCP sender considers the multiple ACKs as duplicate ACKS (or DUPACKs) and determines that the packet has been lost and retransmits the packet associated with the missing sequence number once it has received a specified number of DUPACKs. The number of DUPACKs received prior to determining that the packet is lost is a configurable value or a predetermined value.

If the packet associated with the ACK was not lost, e.g., the ACK indicates a sequence number that is the next packet that the TCP sender is going to transmit, then the TCP sender may adjust transmission protocol parameters, e.g., a send rate and/or a congestion window (block 515). According to an example embodiment, even if the packet associated with the ACK was not lost, the packet may still have encountered congestion, excessive queue length, and the like. Therefore, the TCP sender adjusts the send rate and/or the congestion window according to the WLA and/or the CW bit of the ACK. A detailed description of the adjustments to the send rate and/or the congestion window according to the WLA and/or the CW bit of the ACK is provided below.

If the packet associated with the ACK was lost, e.g., the TCP sender received a specified number of DUPACKs, then the TCP sender may adjust transmission protocol parameters, e.g., a send rate and/or a congestion window, based on a determined cause of the lost packet (block 520). According to an example embodiment, the TCP sender adjusts the send rate and/or the congestion window according to the WLA and/or the CW bit of the ACK (or in this case, the DUPACK), which determines the cause of the lost packet. A detailed description of the adjustments to the send rate and/or the congestion window according to the WLA and/or the CW bit of the DUPACK is provided below. With the send rate and/or the congestion window adjusted, the TCP sender retransmits the lost packet associated with the ACK (block 525).

Figure 6:
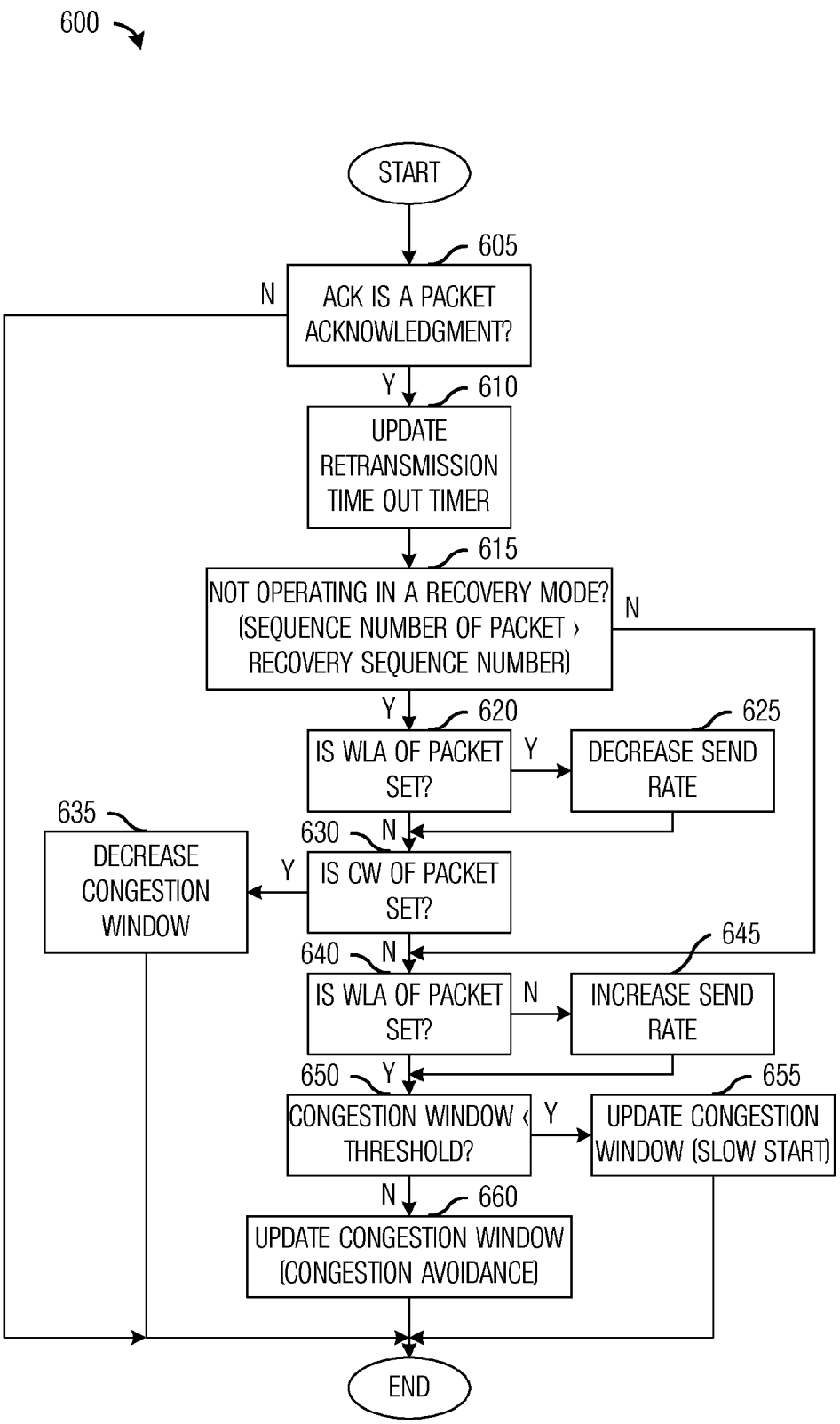
FIG. 6 illustrates an example flow diagram of operations in configuring adjusting a send rate and/or a congestion window according to example embodiments described herein.

FIG. 6 illustrates an example embodiment of a flow diagram of operations 600 in configuring adjusting a send rate and/or a congestion window. Operations 600 may be indicative of operations occurring in a TCP sender, such as server 105 or server 205, as the TCP sender adjusts TCP parameters, such as the send rate and/or the congestion window when a lost packet has not occurred. Part of operations 600 may be an implementation of block 515 of FIG. 5.

Operations 600 may begin after the TCP sender receiving a packet acknowledgement (i.e., an ACK) corresponding to a packet sent by the TCP sender to a UE. The TCP sender may perform a check to determine if the ACK is an acknowledgement of the packet transmitted by the TCP sender or if the ACK is actually a DUPACK, which is a retransmission request for the packet (block 605). If the ACK is not an acknowledgement, then operations 600 may terminate.

If the ACK is an acknowledgement, the TCP sender may update its retransmission time out timer (block 610). According to an example embodiment, the retransmission time out timer is used to determine if the packet associated with the ACK should be retransmitted. Since the ACK is an acknowledgement of the receipt of the packet, the retransmission time out timer is updated to reflect that the packet has been received at the eNB.

The TCP sender may then perform a check to determine if it is not operating in a recovery mode (block 615). According to an example embodiment, the TCP sender does not wish to adjust the congestion window more than one time per received ACK. As an example, the TCP sender determines if it is not operating in the recovery mode by comparing a sequence number of the packet associated with the ACK with a recovery sequence number. If the sequence number of the packet associated with the ACK is greater than the recovery sequence number, then the TCP sender is not operating in the recovery mode.

If the TCP sender is not operating in the recovery mode, the TCP sender may perform a check to determine if the packet associated with the ACK encountered excessive queue wait times (i.e., excessive queue length) (block 620). According to an example embodiment, the TCP sender determines if the packet associated with the ACK encountered excessive queue wait times by checking to see if the WLA of the ACK is set to a specified value, e.g., a true value or "1". If the packet associated with the ACK encountered excessive queue wait times, then the TCP sender may be sending packets too quickly, and it decreases its send rate (block 625).

If the packet associated with the ACK did not encounter excessive queue wait times or after the TCP sender decreases its send rate, the TCP sender may perform another check to determine if the packet associated with the ACK encountered congestion, e.g., Internet congestion (block 630). According to an example embodiment, the TCP sender determines if the packet encountered congestion by checking to see if the CW bit of the ACK is set to a specified value, e.g., a true value or "1". If the packet associated with the ACK encountered congestion, the TCP sender may decrease the size of its congestion window (block 635). Operations 600 may terminate.

If the packet associated with the ACK did not encounter congestion or if the TCP sender is operating in the recovery mode (block 615), then the TCP sender may perform a check to determine if the packet associated with the ACK encountered excessive queue wait times (i.e., excessive queue length) (block 640). According to an example embodiment, the TCP sender determines if the packet associated with the ACK encountered excessive queue wait times by checking to see if the WLA of the ACK is set to a specified value, e.g., a true value or "1". If the packet associated with the ACK did not encounter excessive queue wait times, then the TCP sender may be able to increase the send rate of its packets, and it increases its send rate (block 645).

If the packet associated with the ACK did encounter excessive queue wait times or after the TCP sender increases its send rate, the TCP sender may adjusts its congestion window. The TCP sender perform a check to determine if the congestion window is less than a threshold to select an appropriate technique to adjust its congestion window (block 650). According to an example embodiment, if the congestion window is less than the threshold then the TCP sender adjusts its congestion window using a slow start adjustment technique. However, if the congestion window is larger than the threshold then the TCP sender adjusts its congestion window using a congestion avoidance technique.

Figure 7:
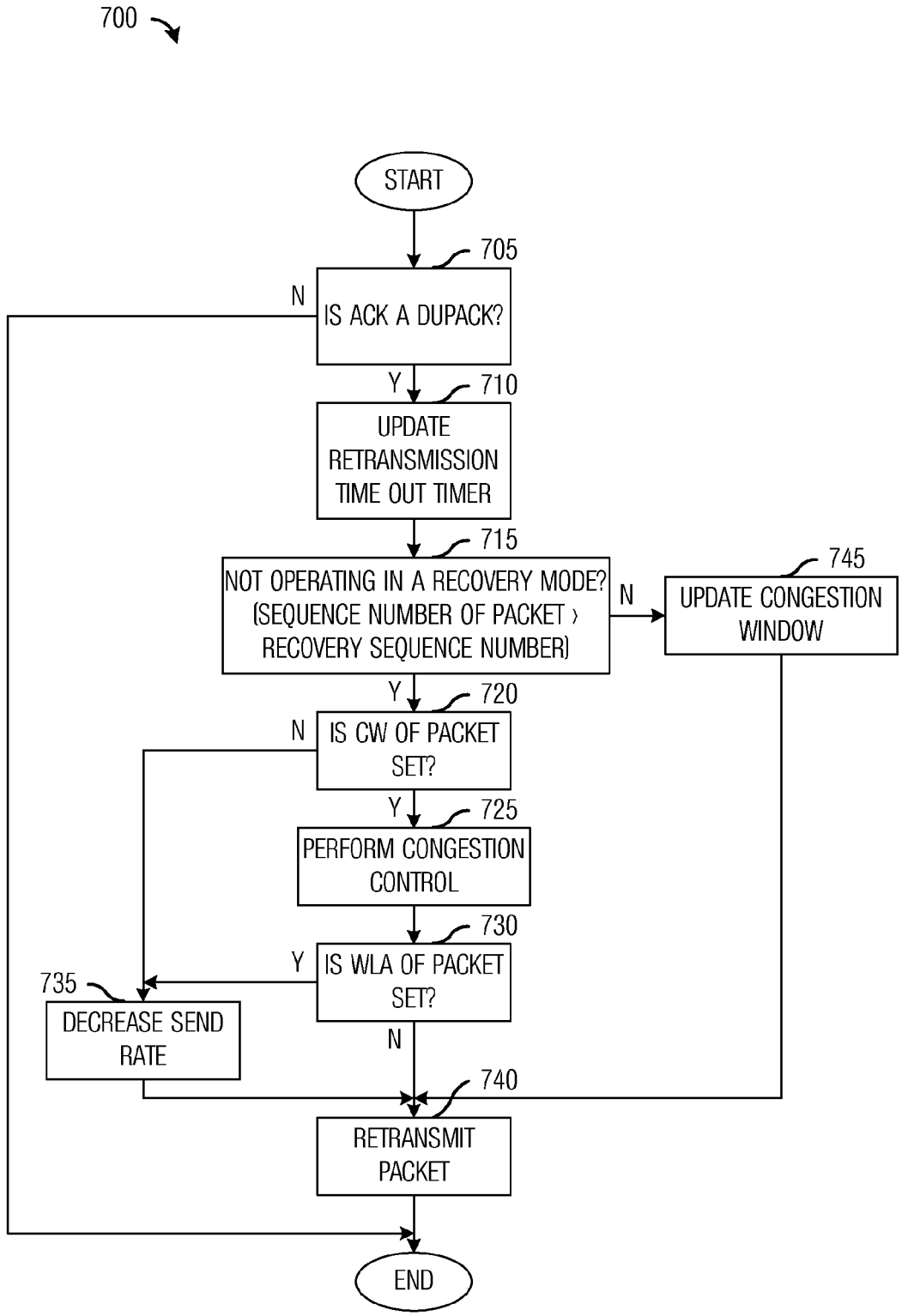
FIG. 7 illustrates an example flow diagram of operations in configuring adjusting a send rate and/or a congestion window according to a cause of a lost packet according to example embodiments described herein.

FIG. 7 illustrates an embodiment of a flow diagram of operations 700 in configuring adjusting a send rate and/or a congestion window according to a cause of a lost packet. Operations 700 may be indicative of operations occurring in a TCP sender, such as server 105 or server 205, as the TCP sender adjusts TCP parameters, such as the send rate and/or the congestion window when a lost packet has occurred. Operations 700 may be an implementation of block 520 of FIG. 5.

Operations 700 may begin after the TCP sender receiving a packet acknowledgement (i.e., an ACK) corresponding to a packet sent by the TCP sender to a UE. The TCP sender may perform a check to determine if the ACK is a DUPACK, which is a retransmission request for the packet (block 705). If the ACK is not a DUPACK, then operations 700 may terminate.

If the ACK is a DUPACK, the TCP sender may update its retransmission time out timer (block 710). According to an example embodiment, the retransmission time out timer is used to determine if the packet associated with the DUPACK should be retransmitted. Since the DUPACK is retransmission request of the packet, the retransmission time out timer is updated to reflect that the packet has not been received at the eNB.

The TCP sender may then perform a check to determine if it is not operating in a recovery mode (block 715). According to an example embodiment, the TCP sender does not wish to adjust the congestion window more than one time per received DUPACK. As an example, the TCP sender determines if it is not operating in the recovery mode by comparing a sequence number of the packet associated with the DUPACK with a recovery sequence number. If the sequence number of the packet associated with the DUPACK is greater than the recovery sequence number, then the TCP sender is not operating in the recovery mode.

If the TCP sender is not operating in the recovery mode, the TCP sender may perform a check to determine if the packet associated with the DUPACK was lost due to congestion, e.g., Internet congestion (block 720). According to an example embodiment, the TCP sender determines if the packet associated with the DUPACK was lost due to congestion by checking to see if the CW bit of the DUPACK was set to a specified value, e.g., a true value or "1". If the packet associated with the DUPACK was lost due congestion, the TCP sender may perform congestion control (block 725), and decrease the congestion window by one-half, for example. According to an example embodiment, the TCP sender may utilize a congestion control technique as provided in TCP New Reno.

After performing congestion control, the TCP sender may perform a check to determine if the packet associated with the DUPACK was lost due to wireless errors (block 730). According to an example embodiment, the TCP sender determines if the packet associated with the DUPACK was lost due to wireless errors by checking to see if the WLA of the DUPACK is set to a specified value, e.g., a true value or "1". If the packet associated with the DUPACK was lost due to wireless errors, the TCP sender may decrease the send rate (block 735). If the packet associated with the DUPACK was not lost due to wireless errors, the TCP sender may retransmit the packet (block 740). Operations 700 may terminate.

If the packet associated with the DUPACK was not lost due to congestion (block 720), then the TCP sender may decrease the send rate (block 735) and retransmit the packet (block 740). Operations 700 may terminate.

If the TCP sender is not operating in the recovery mode (block 715), then the TCP sender may update its congestion window (block 745) and retransmit the packet (block 740). Operations 700 may terminate.

Figure 8:
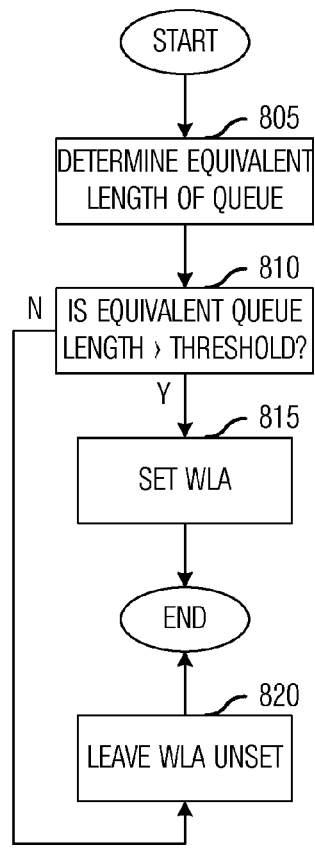
FIG. 8 illustrates an example flow diagram of operations in setting a Wireless Loss Alarm (WLA) of an ACK of a packet according to example embodiments described herein.

FIG. 8 illustrates an embodiment of a flow diagram of operations 800 in setting a WLA of an ACK of a packet. Operations 800 may be indicative of operations occurring in an eNB, such as eNB 120 and eNB 220, as the eNB transmits a packet in its queue to a UE.

Operations 800 may begin with the eNB determining an equivalent length of its queue for packets to be transmitted to the UE (block 805). According to an example embodiment, the eNB determines the equivalent length of its queue by calculating $$L_E = \begin{cases} \dfrac{L_I}{1-(n/\beta)^3} & \text{for } n < \beta \\ L_{th} & \text{for } n \geq \beta, \end{cases}$$

where $L_E$ is the equivalent queue length, $L_1$ is the instantaneous downlink queue length when the uplink ACK arrives at the BS, $L_{th}$ is the ACK marking threshold, n is the number of consecutive HARQ retransmissions, and $\beta$ is maximum allowed HARQ retransmission.

The eNB may then perform a check to determine if its equivalent queue length is greater than a prespecified threshold (block 810). If the equivalent queue length is greater than the predetermined threshold, then the eNB will mark the WLA of the ACK associated with the packet (block 815). If the equivalent queue length is not greater than the predetermined threshold, then the eNB will not mark the WLA of the ACK associated with the packet (block 820).

Figure 9:
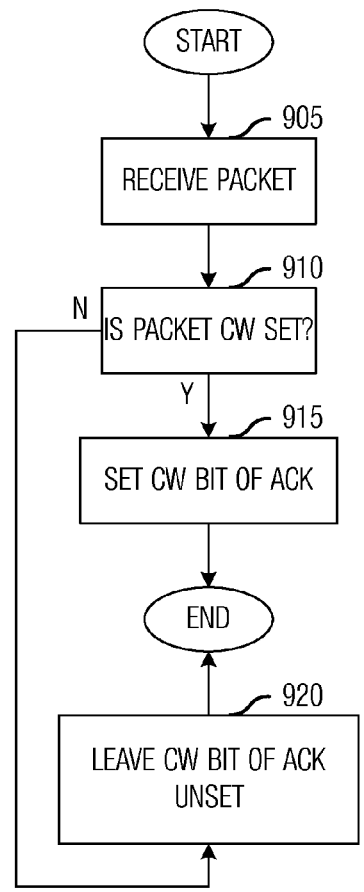
FIG. 9 illustrates an example flow diagram of operation in setting a Congestion Warning (CW) bit of an ACK of a packet according to example embodiments described herein.

FIG. 9 illustrates an example embodiment of a flow diagram of operation 900 in setting a CW bit of an ACK of a packet. Operations 900 may be indicative of operations occurring in an eNB, such as eNB 120 and eNB 220, as the eNB transmits a packet in its queue to a UE.

Operations 900 may begin with the eNB receiving a packet to transmit to the UE (block 905). The eNB may perform a check to determine if the packet has its CW bit set (block 910). According to an example embodiment, if at any router along its transmission path from a TCP sender to the eNB the packet encounters congestion, e.g., Internet congestion, the router sets the CW bit of the packet.

If the CW bit of the packet is set, then the eNB sets the CW bit of the ACK associated with the packet (block 915). If the CW bit is not set, then the eNB does not set the CW bit of the ACK associated with the packet (block 920).

Figure 10:
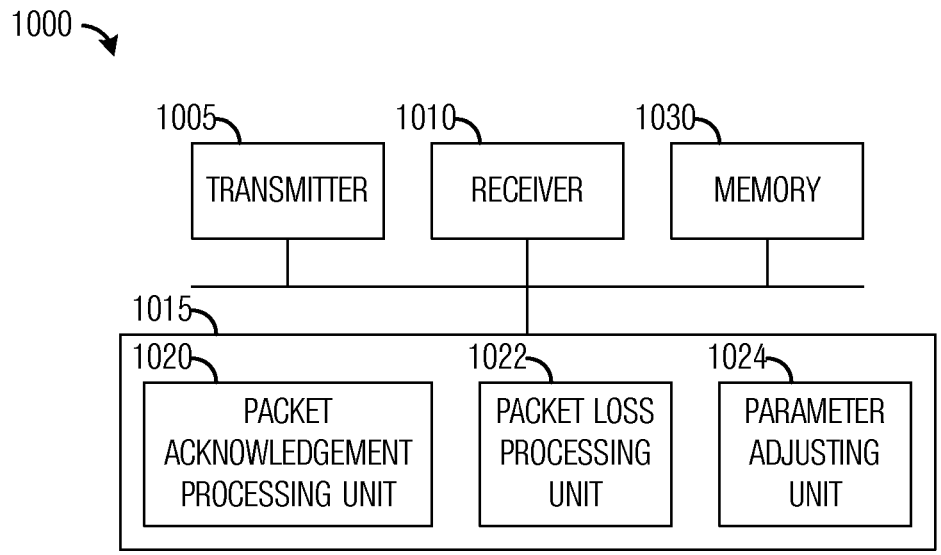
FIG. 10 illustrate a first communications device according to example embodiments described herein.

FIG. 10 illustrates a first communications device 1000. Communications device 1000 may be used to implement various ones of the embodiments discussed herein. As an example, communications device 1000 may be used to implement a TCP sender, such as server 105 and server 205. As shown in FIG. 10, a transmitter 1005 is configured to transmit information. A receiver 1010 is configured to receive information. Transmitter 1005 and receiver 1010 may have a wireless interface, a wireline interface, or a combination thereof.

A packet acknowledgement processing unit 1020 is configured to process received packet acknowledgements. Packet acknowledgement processing unit 1020 is configured to determine if the packet acknowledgement corresponds to a previously transmitted packet that has or has not been lost. A packet lock processing unit 1022 is configured to determine a cause of the loss of the previously transmitted packet. As discussed previously, the previously transmitted packet may be loss due to wireless errors, congestion, traffic conditioners, and the like. A parameter adjusting unit 1024 is configured to adjust transmission protocol parameters, such as send rate, congestion window, and the like, according to communications system state included in the packet acknowledgements. Memory 1030 is configured to store packet acknowledgements, sequence numbers, packets, transmission parameters, and the like. Memory 1030 comprises solid-state memory, solid-state disks, hard disks, remote network storage, or a combination thereof.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1005 and transmitter 1010 may be implemented as a specific hardware blocks, while packet acknowledgement processing unit 1020, packet loss processing unit 1022, and parameter adjusting unit 1024 may be software modules executing in a processor 1015, microprocessor, a custom circuit, or a custom compiled logic array of a field programmable logic array.

Figure 11:
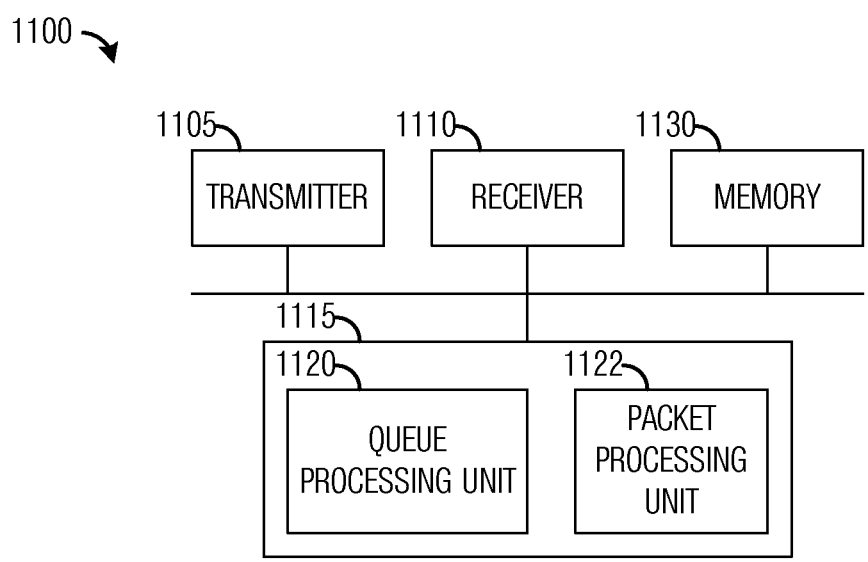
FIG. 11 illustrates a second communications device according to example embodiments described herein.

FIG. 11 illustrates a first communications device 1100. Communications device 1100 may be used to implement various ones of the embodiments discussed herein. As an example, communications device 1100 may be used to implement a communications controller, such as eNB 120 and eNB 220, serving as an interface between a wireless part of a wireless communications system and a wireline part of the wireless communications system. As shown in FIG. 11, a transmitter 1105 is configured to transmit information. A receiver 1110 is configured to receive information. Transmitter 1105 and receiver 1110 may have a wireless interface, a wireline interface, or a combination thereof.

A queue processing unit 1120 is configured to determine an equivalent queue length for a packet queue. A packet processing unit 1122 is configured to mark packets in a packet queue according to the equivalent queue length or a queue wait time. Memory 1130 is configured to store packets, packet acknowledgements, equivalent queue lengths, queue wait times, and the like. Memory 1130 comprises solid-state memory, solid-state disks, hard disks, remote network storage, or a combination thereof.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1105 and transmitter 1110 may be implemented as a specific hardware blocks, while queue processing unit 1120 and packet processing unit 1122 may be software modules executing in a processor 1115, microprocessor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for delivering packets in a wireless communications system, the method comprising:
   determining a cause of loss for a previously transmitted packet based on a packet acknowledgement corresponding to the previously transmitted packet, the packet acknowledgement including at least one loss indicator for the wireless communications system, wherein the loss indicator identifies which of at least three potential causes of loss is the cause of loss, wherein the at least three potential causes of loss include wireless errors, network congestion, and a traffic conditioner;
   adjusting a transmission parameter in a packet transmission protocol according to the cause of loss; and
   retransmitting the previously transmitted packet,
   wherein adjusting the transmission parameter comprises decreasing a packet send rate if the previously transmitted packet was lost due to a wireless error.

2. The method of claim 1, wherein adjusting the transmission parameter comprises performing congestion control if the previously transmitted packet was lost due to congestion.

3. The method of claim 1, wherein adjusting the transmission parameter comprises decreasing a packet send rate if the previously transmitted packet was not lost due to congestion.

4. The method of claim 1, further comprising receiving the packet acknowledgement from a network entity serving as an interface between a wireless part of the wireless communications system and a wireline part of the wireless communications system.

5. The method of claim 1, wherein the loss indicator comprises a wireless loss indicator and wherein determining the cause of loss comprises determining that the cause was a wireless error in response to determining that the wireless loss indicator was set to a true value.

6. The method of claim 1, wherein the loss indicator comprises a congestion warning indicator and wherein determining the cause of loss comprises determining that the cause was congestion in response to determining that the congestion warning indicator in the packet acknowledgement was set to a true value.

7. The method of claim 1, wherein the packet acknowledgement is a duplicate of a previously received packet acknowledgement associated with the previously transmitted packet.

8. The method of claim 1, wherein the packet transmission protocol is a transmission control protocol.

9. A method for delivering packets in a wireless communications system, the method comprising:
  determining if a previously transmitted packet has been lost in transmission according to a sequence number in a packet acknowledgement corresponding to the previously transmitted packet;
  adjusting a first transmission parameter in a packet transmission protocol according to a wireless loss indicator and a congestion warning indicator in the packet acknowledgement, if the previously transmitted packet has not been lost; and
  adjusting a second transmission parameter in the packet transmission protocol according to the wireless loss indicator and the congestion warning indicator in the packet acknowledgement, and retransmitting the previously transmitted packet, if the previously transmitted packet has been lost, wherein the wireless loss indicator identifies which of at least three potential causes of loss is the cause of loss of the previously transmitted packet, wherein the at least three potential causes of loss include wireless errors, network congestion, and a traffic conditioner,
  wherein adjusting the first transmission parameter comprises decreasing a packet send rate if the wireless loss indicator indicates that a packet queue length exceeds a specified threshold.

10. The method of claim 9, wherein determining if the previously transmitted packet has been lost comprises:
  determining that the previously transmitted packet has been lost if the packet acknowledgement is a duplicate of a previously received packet acknowledgement associated with the previously transmitted packet; and
  determining that the previously transmitted packet has not been lost if the packet acknowledgement acknowledges receipt of the previously transmitted packet.

11. The method of claim 9, wherein adjusting the first transmission parameter comprises decreasing a congestion window size if the wireless loss indicator indicates that a packet queue length does not exceed a specified threshold and that the congestion warning indicator indicates that the wireless communications system is experiencing congestion.

12. The method of claim 9, wherein adjusting the first transmission parameter comprises increasing a packet send rate if the wireless loss indicator indicates that a packet queue length does not exceed a specified threshold and that congestion warning indicator indicates that the wireless communications system is not experiencing congestion.

13. The method of claim 9, wherein adjusting the first transmission parameter comprises updating a congestion window if the congestion warning indicator indicates that the wireless communications system is not experiencing congestion and that the wireless loss indicator indicates that a packet queue length exceeds a specified threshold.

14. The method of claim 9, wherein adjusting the second transmission parameter comprises performing congestion control if the congestion warning indicator indicates that the previously transmitted packet was lost due to congestion.

15. The method of claim 9, wherein adjusting the second transmission parameter comprises decreasing a packet send rate if the wireless loss indicator indicates that the previously transmitted packet was lost due to a wireless error.

16. The method of claim 9, wherein adjusting the second transmission parameter comprises decreasing a packet send rate if the congestion warning indicator indicates that the previously transmitted packet was not lost due to congestion.

17. A packet source comprising:
  a processor configured to determine a cause of loss for a previously transmitted packet based on a packet acknowledgement corresponding to the previously transmitted packet, the packet acknowledgement including at least one loss indicator for a wireless communications system, wherein the loss indicator identifies which of at least three potential causes of loss is the cause of loss, wherein the at least three potential causes of loss include wireless errors, network congestion, and a traffic conditioner, and to adjust a transmission parameter in a packet transmission protocol according to the cause of loss; and
  a transmitter operatively coupled to the processor, the transmitter configured to retransmit the previously transmitted packet,
  wherein the processor is configured to decrease a packet send rate if the previously transmitted packet was lost due to a wireless error.

18. The packet source of claim 17, wherein the processor is configured to perform congestion control if the previously transmitted packet was lost due to congestion.

19. The packet source of claim 17, wherein the processor is configured to decrease a packet send rate if the previously transmitted packet was not lost due to congestion.

20. The packet source of claim 17, further comprising a receiver operatively coupled to the processor, wherein the receiver is configured to receive the packet acknowledgement from a network entity serving as an interface between a wireless part of the wireless communications system and a wireline part of the wireless communications system, the packet acknowledgement corresponding to the previously transmitted packet.

* * * * *